United States Patent [19]
Takahashi et al.

[11] 3,855,300
[45] Dec. 17, 1974

[54] PROCESS FOR THE PRODUCTION OF 2-AMINO-1-BUTANOL

[75] Inventors: Makoto Takahashi; Tsunetoshi Shioya; Takashi Kobayashi; Tatsuji Fujii; Masakuni Nishimura, all of Kamakura, Japan

[73] Assignee: Sankyo Chemical Industries, Ltd., Tokyo, Japan

[22] Filed: Sept. 5, 1973

[21] Appl. No.: 394,540

[52] U.S. Cl...... 260/584 R, 260/566 D, 260/561 R, 260/558 R
[51] Int. Cl............................................. C07c 89/00
[58] Field of Search..................... 260/584 R, 566 D

[56] References Cited
UNITED STATES PATENTS
3,639,479   2/1972   Arlt................................. 260/566 D Primary Examiner—Lewis Gotts
Assistant Examiner—D. R. Phillips
Attorney, Agent, or Firm—Bierman & Bierman

[57] ABSTRACT

A process is disclosed in which 2-amino-1-butanol is prepared. The process comprises reacting 1-butene with chlorine and a nitrile compound. The resultant product is then hydrolyzed to produce 2-amino-1-butanol.

3 Claims, No Drawings

PROCESS FOR THE PRODUCTION OF 2-AMINO-1-BUTANOL

This invention relates to an improved process for the production of 2-amino-1-butanol which is useful as an intermediate for the synthesis of ethambutol known as an anti-tuberclotic agent.

Heretofore known is a process for the production of 2-amino-1-butanol which comprises condensing nitropropane with formaldehyde and reducing the resulting nitrobutanol (cf. B. M. Vanderbilt, et al., Industrial Engineering Chemistry Vol. 32 (1940), page 34 et seq.). This process, however, has suffered from a disadvantage that the starting nitropropane is not readily available because of the synthetic problem.

Ethambutol has a growing importance and hence it is a serious technical need to provide a commercially feasible process for the production of 2-amino-1-butanol.

According to the present invention, there is provided an improved process for the production of 2-amino-1-butanol which comprises reacting 1-butene with chlorine and a nitrile compound and hydrolyzing the resulting reaction product.

In carrying out the present invention in practice, gaseous 1-butene and chlorine are introduced into a nitrile compound which may be liquid, and then, the reaction mixture is added with water to effect hydrolysis of the reaction product. The reactions which take place in the process of the present invention can be represented by the following scheme.

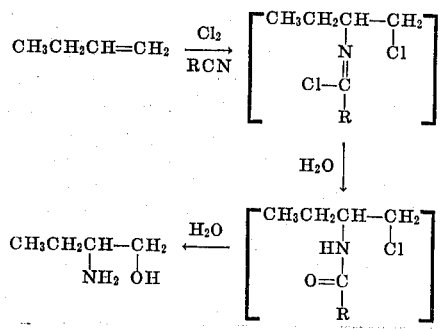

The nitrile compound which is necessary as an origin of an amino group may not be limited in its variety, but preferrably a normally liquid nitrile compound can be advantageously used because it serves as a solvent for the intended reaction. Suitable nitrile compounds include acetonitrile, propionitrile, benzonitrile, etc. The amount of the nitrile compound used may vary from a stoichiometric amount to twice or more the molar amount of 1-butene used, such a part of the nitrile as exceeding its stoichiometric amount apparently serving as a solvent medium. No limitation is given in terms of the amount of chlorine used. In case of the nitrile compound being acetonitrile, however, chlorine should not be used in amount exceeding one mole per mole of the 1-butene, since excessive chlorine leads formation of undesired byproduct with lowering yield. There is no criticality in reaction temperature, but desirably it is kept within the range of about −20°C. to about 40°C., in order to avoid loss of the butene. Reaction period will vary depending on the reaction temperature but usually the reaction will be complete within 30 minutes to 1 hour after completion of addition of the butene and chlorine.

Hydrolysis of the thus obtained reaction mixture is carried out by adding the said mixture with water and keeping the total mixture at room temperature or under reflux for several hours. Addition of hydrochloric or other mineral acid to the system will promote the hydrolysis with decreasing the required time period for the intended hydrolysis. The hydrolysis may be carried out in a single step. However, the two-step hydrolysis is desirable due to increased yield, wherein the reaction mixture is stirred in ice water to effect the former-half of the hydrolysis and then, after distilling the excess nitrile and by-product off from the reaction mixture, the residue is heated and refluxed, as it is or together with added mineral acid, to complete the latter-half of the hydrolysis. The expression "the former-half" or "the latter-half" of the hydrolysis will be clearly understood for those skilled in the art by reference to the above-indicated scheme. After completion of the hydrolysis, the reaction mixture is worked up to remove water and then 2-amino-1-butanol can be recovered as the hydrochloride, which may be converted into free 2-amino-1-butanol by alkalification and rectification.

The starting material used in the process of the present invention is easily obtainable from petroleum cracked gases. Such commercial availability, associated with its inexpensiveness, makes the present invention extremely commercially attractive.

Now the present invention will be explained in detail by way of the following examples.

EXAMPLE 1

Into 82 g. (2.0 moles) of acetonitrile is introduced 28 g. (0.5 mole) of 1-butene at −15°C. with stirring. Into the resulted mixture, with further stirring, 30 g. (0.42 mole) of chlorine is blown at −15° − −10°C. After completion of the introduction cooling is discontinued, and the mixture is stirred for 30 minutes to complete the reaction. The reaction mixture is then poured into 150 ml. of ice water. Due to exotherm, the temperature of the mixture raises up to 30°C., at which said mixture is stirred for 30 minutes. With heating, 100 ml. of water is added to the mixture and then excessive acetonitrile and 1,2-dichlorobutane (by-product) are distilled off. When the temperature reaches 100°C., 25 g. of conc. HCl is added to the system which is then refluxed for 5 hours. After completion of the hydrolysis, the reaction mixture is distilled under reduced pressure to remove the solvent. The residue, 2-amino-1-butanol hydrochloride, is added with 15 ml. of water and neutralized to pH 11.3 at 0°C. with 50% NaOH aq. The separated salt is removed by filtration. The filtrate is distilled under 100 mm Hg to remove water and further under 20 mm Hg thereby to obtain 2-amino-1-butanol (yield 35%) boiling at 83° − 84°C./20 mm Hg. The product has a purity of 92.0%, with 0.8% water and 6.2% 1-amino-2-butanol.

EXAMPLE 2

28 g. (0.5 mole) of 1-butene and 30 g. (0.42 mole) of chlorine are concurrently introduced into 41 g. (1.0 mole) of acetonitrile, with stirring, at −5° to 0°C. Stirring is continued for additional 30 minutes to complete the reaction. The reaction mixture is worked up in the same manner as in Example 1, thereby to obtain 2-amino-1-butanol (yield 38%). The product has a purity of 90.0%, with 0.8% water and 8.6% 1-amino-2-butanol.

EXAMPLE 3

28 g. (0.5 mole) of 1-butene and 30 g. (0.42 mole) of chlorine are concurrently introduced into 103 g. (1.0 mole) of benzonitrile, with stirring, at 0° to 5°C. Stirring is continued for an additional 30 minutes with keeping same temperature. The reaction mixture is worked up in the same manner as in Example 1, thereby to obtain 2-amino-1-butanol (yield 40%).

What we claim is:

1. A process for the production of 2-amino-1-butanol, which comprises reacting 1-butene with chlorine and a nitrile compound and then hydrolyzing the resulting reaction product.

2. A process for the production of 2-amino-1-butanol, as claimed in claim 1, wherein said nitrile compound is acetonitrile, propionitrile or benzonitrile.

3. A process for the production of 2-amino-1-butanol as claimed in claim 1, wherein the reaction of 1-butene with chlorine and the nitrile compound is carried out by using an excess amount of the nitrile compound, a part of which serves as a solvent.

* * * * *

PO-1050
(5/69)

UNITED STATES PATENT OFFICE
CERTIFICATE OF CORRECTION

Patent No. 3,855,300          Dated December 17, 1974

Inventor(s) Makoto Takahashi; Tsunetoshi Shioya; Takashi Kobashi; Tatsui Fujii; Masakuni Nishimura It is certified that error appears in the above-identified patent and that said Letters Patent are hereby corrected as shown below:

On title page insert: -- [30] Foreign Application Priority Data
September 6, 1972 Japan..47-89308--

Signed and sealed this 15th day of April 1975.

(SEAL)
Attest:

RUTH C. MASON
Attesting Officer

C. MARSHALL DANN
Commissioner of Patents
and Trademarks